July 3, 1956   E. J. TOMS   2,753,155
DRILL BIT
Filed June 23, 1954

INVENTOR.
Ernest J. Toms
BY Alex. E. MacRae
Attorney.

United States Patent Office 2,753,155
Patented July 3, 1956

2,753,155

DRILL BIT

Ernest J. Toms, Welland, Ontario, Canada

Application June 23, 1954, Serial No. 438,712

1 Claim. (Cl. 255—63)

This invention relates to drill bits and more particularly drill bits for drilling rock and soil as in the formation of gas and oil wells.

An object of the invention is to provide a bit having a large length of cutting edge thereby greatly to increase the strength and life of the bit.

Another object of the invention is to provide a bit having deep peripheral escape channels without greatly decreasing the cutting edge length.

A further object of the invention is to provide a bit having cutting surfaces so arranged as to guide the cuttings to escape channels in the bit.

Figure 1:
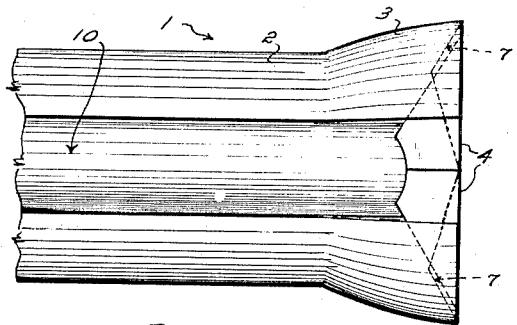
Figure 3:
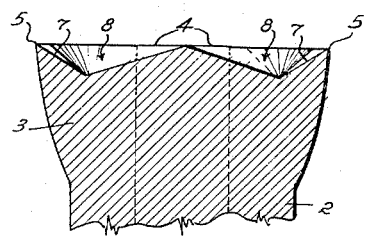
Figure 2:
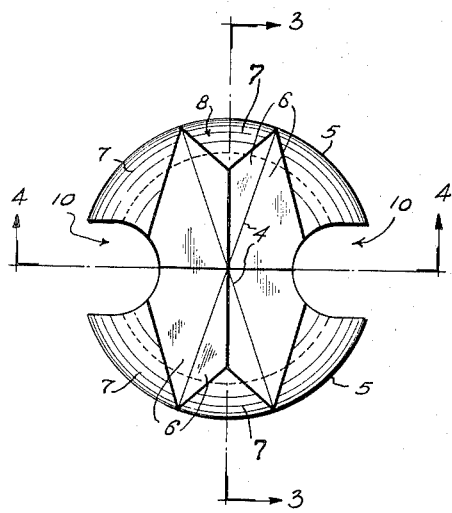
Figure 4:
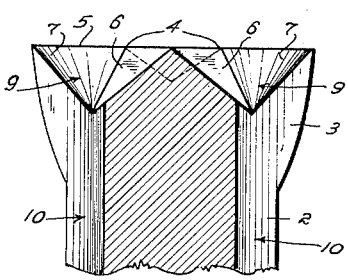

The invention will be described with reference to the accompanying drawings in which, Figure 1 is an elevation of the bit in accordance with the present invention, Figure 2 is an end plan view of the bit, Figure 3 is a section through 3—3 of Figure 2, and Figure 4 is a section through 4—4 of Figure 2.

Referring to the drawings, the bit 1 comprises a shank portion 2 and an enlarged cutting head 3. The cutting head comprises a cutting face having two straight diametral cutting edges 4 and two arcuate circumferential cutting edges 5, all the cutting edges being substantially in the same plane.

The two diametral cutting edges 4 intersect at the center of the bit at an angle less than a right angle and as shown, extend substantially from one side of the circumference of the bit to the other. The diametral cutting edges are formed at the intersection of straight bevelled surfaces 6.

The two arcuate cutting edges are each less than 180° in length but generally greater than 90° in length. The arcuate cutting edges are formed at the intersection of arcuate bevelled surfaces 7 and the exterior longitudinal surface of the bit.

The straight bevelled surfaces 6 and the arcuate bevelled surfaces 7 define two pairs of recesses 8 and 9, 8 indicating the small shallow recesses between the diametral edges 4 which are at less than a right angle and arcuate edges 5 and 9 indicating large deeper recesses between the complementary diametral edges 4 and portions of the arcuate edges 5.

Two escape channels 10 extend from said large rececces 9 in the cutting head 3 along the length of the shank portion 2 of the bit. Said escape channels 10 are substantially opposite each other and are radially aligned. Each channel 10 is of substantial width and depth to provide adequate escape of cuttings. As shown, each channel has a width (in the circumferential direction of the bit) which is approximately equal to its depth (in the radial direction of the bit). Preferably, the width and depth dimensions are so chosen that the width dimension will not be greater than twice the depth dimension but will not be less than such depth dimension. The embodiment shown in the drawings discloses an escape channel 10 substantially semicircular in section throughout the length of the shank portion 2. The cutting head 3 is somewhat enlarged and thus the said channel 10 is somewhat larger than a semicircle in a section through the head 3. While the dimensions of the escape channel may vary in accordance with operating conditions, a channel as described above and having a depth approximately half the radius in the plane of the cutting edges is satisfactory.

The arrangement of two continuous diametral cutting edges intersecting at an acute angle with circumferential cutting edges extending throughout the circumferential extent of the cutting head and interruted only by escape channels results in a greater aggregate length of cutting edge than has heretofore been possible in this type of bit. The provision of two escape channels of the relative size defined permits adequate escape of cuttings without greatly diminishing the aggregate length of cutting edge. The location of the escape channels in symmetrical relation on opposite sides of the pair of intersecting diametral cutting edges results in a maximum cutting efficiency across the whole surface under the cutting head as well as adequate escape for cuttings.

It will be observed that the arrangement of bevelled surfaces 6 and 7 guide the cuttings into large recesses 9 and thence into escape channels 10. The cuttings which may be present in the small recesses 8 will tend to move into the path of the larger recesses 9 during the vibratory rotation of the bit in normal rock drilling operation. Minimum contact of the cutting edges with the individual cuttings is accomplished thus speeding drilling and prolonging the life of the bit. The gauge of the hole is maintained by the arcuate edges and the design offers no protruding edges which are susceptible to chipping or breaking off, such as are found on conventional bits.

I claim:

A drill bit comprising a shank and an enlarged generally circular head thereon having a cutting face, said bit having a pair of opposed clearance grooves extending longitudinally along said shank and head, said cutting face having arcuate bevelled surfaces adjacent the periphery thereof and forming a pair of peripheral arcuate cutting edges, each said arcuate cutting edge extending from one of said grooves to the other of said grooves, said cutting face also having a plurality of straight bevelled surfaces meeting along a pair of straight lines each extending between a point on one of said arcuate edges to a point on the other of said arcuate edges to form a straight continuous diametral cutting edge, said straight cutting edges intersecting at an acute angle, all of said cutting edges being disposed in a common plane.

References Cited in the file of this patent

UNITED STATES PATENTS

| 753,503 | Martin | Mar. 1, 1904 |
| 1,036,673 | Meguire | Aug. 27, 1912 |
| 1,551,717 | Watson | Sept. 1, 1925 |
| 1,571,348 | Stee | Feb. 2, 1926 |

FOREIGN PATENTS

| 30,578 | Great Britain | July 21, 1910 |